United States Patent
Kim et al.

(10) Patent No.: US 8,755,851 B2
(45) Date of Patent: Jun. 17, 2014

(54) BACK COVER FOR MOBILE TERMINALS

(71) Applicant: Smart Power Solutions, Inc., Daejeon (KR)

(72) Inventors: Hyun-Jun Kim, Daejeon (KR); Dae-Young Youn, Seoul (KR); Jung-Gyo Kim, Daejeon (KR)

(73) Assignee: Smart Power Solutions, Inc., Daejeon (KR)

( * ) Notice: Subject to any disclaimer, the term of this patent is extended or adjusted under 35 U.S.C. 154(b) by 20 days.

(21) Appl. No.: 13/689,765

(22) Filed: Nov. 30, 2012

(65) Prior Publication Data

US 2014/0066138 A1   Mar. 6, 2014

(30) Foreign Application Priority Data

Aug. 31, 2012   (KR) .................... 20-2012-0007808 U

(51) Int. Cl.
*H04W 52/00*   (2009.01)

(52) U.S. Cl.
USPC ...... 455/575.1; 455/572; 455/573; 455/575.8

(58) Field of Classification Search
USPC ................ 455/571, 550.1–557, 343.1–343.6
See application file for complete search history.

(56) References Cited

U.S. PATENT DOCUMENTS

| | | | |
|---|---|---|---|
| 7,311,526 B2 | 12/2007 | Rohrbach et al. | |
| 7,762,817 B2 | 7/2010 | Ligtenberg et al. | |
| 2009/0137293 A1* | 5/2009 | Yoo et al. | 455/575.4 |
| 2011/0111812 A1* | 5/2011 | Kim | 455/575.1 |
| 2011/0127959 A1* | 6/2011 | McGary et al. | 320/114 |
| 2012/0088555 A1* | 4/2012 | Hu | 455/573 |
| 2012/0329532 A1* | 12/2012 | Ko | 455/573 |

FOREIGN PATENT DOCUMENTS

| | | |
|---|---|---|
| JP | 2011097770 | 5/2011 |
| KR | 100505847 | 7/2005 |
| KR | 100623492 | 9/2006 |

\* cited by examiner

*Primary Examiner* — Charles Appiah
*Assistant Examiner* — Sau Christensen
(74) *Attorney, Agent, or Firm* — Oppedahl Patent Law Firm LLC

(57) ABSTRACT

A back cover for mobile terminals which protects the rear surface of a mobile terminal having a battery in the rear surface. The back cover includes: a cover body mounted to the rear surface of the mobile terminal; hooks formed on the edge of the cover body and locked to the rear surface of the mobile terminal; a terminal unit provided on a first surface of the cover body at a location corresponding to terminals of the mobile terminal; a pattern electrode unit provided on a second surface of the cover body and electrically connected to the terminal unit, the pattern electrode unit having an electrode that electrically connects the terminals of the mobile terminal to an outside charger; and a magnet placed in the cover body and magnetically connected to the outside charger.

9 Claims, 7 Drawing Sheets front surface rear surface

BACK COVER FOR MOBILE TERMINALS

BACKGROUND OF THE INVENTION

1. Field of the Invention

The present invention relates, in general, to back covers for mobile terminals and, more particularly, to a back cover for mobile terminals which covers and protects the rear surface of a mobile terminal that has a battery in the rear surface of the mobile terminal.

2. Description of the Related Art

Mobile terminals, such as cellular phones, Smartphones and PDA (Personal Digital Assistant) phones, have good mobility and good portability so that they are generally used. Further, a variety of wire chargers that are used to charge batteries of the mobile terminals are produced, in which the chargers have different sizes and shapes according to those of the batteries. Further, due to the recent trends of functional improvement and lightness of the mobile terminals that have been intended to realize the requirements of consumers, a variety of mobile terminals and a variety of special chargers are produced by the same manufacturer.

The power of mobile terminals may be formed by electrically charging the mobile terminals with DC power using power suppliers, such as adapters, or by electrically charging the batteries that are installed in the mobile terminals. Here, the adapters are devices that can convert input commercial AC power into a preset DC voltage.

To electrically charge a mobile terminal with DC power, it is required to connect a female connector of the mobile terminal to a male connector of an adapter.

However, the connection formed by inserting the male connector into the female connector may cause damage to both connectors during a connecting process and causes disadvantages in that a user must vertically insert the male connector into the female connector after finding the female connector of the mobile terminal and the user must pull out the male connector from the female connector.

Further, a conventional back cover for mobile terminals has a simple function of covering the rear surface of the mobile terminal so as to prevent elements that are installed in the rear surface from being exposed to the outside.

SUMMARY OF THE INVENTION

Accordingly, the present invention has been made keeping in mind the above problems occurring in the related art, and the present invention is intended to propose a back cover for mobile terminals which can realize the electric charging of a mobile terminal by connecting the mobile terminal to an outside charger using a magnet without connecting them using male and female connectors.

Further, the present invention intended to propose a back cover for mobile terminals which can realize the electric charging of a mobile terminal using the mobile terminal itself without using a separate cradle.

The object of the present invention is not limited to the above-mentioned objects.

In order to achieve the above objects, according to one aspect of the present invention, there is provided a back cover for mobile terminals, which is mounted to a rear surface of a mobile terminal so as to electrically charge the mobile terminal using terminals provided by the mobile terminal, the back cover including: a cover body mounted to a rear surface of the mobile terminal; a plurality of hooks formed on an edge of the cover body and locked to the rear surface of the mobile terminal; a terminal unit provided on a first surface of the cover body at a location corresponding to the terminals of the mobile terminal; a pattern electrode unit provided on a second surface of the cover body and electrically connected to the terminal unit, the pattern electrode unit having an electrode that electrically connects the terminals of the mobile terminal to an outside charger; and a magnet installed in the cover body and magnetically connected to the outside charger.

In an embodiment, the pattern electrode unit may include concentric circular electrodes.

Further, the pattern electrode unit may be arranged in a through hole formed in a predetermined portion of the cover body adjacent to the terminal unit and is exposed to the second surface of the cover body.

The back cover may further include: a step formed around the through hole; and a support held by the step and supporting the pattern electrode unit in such a way that the support prevents the pattern electrode unit from protruding outside the second surface of the cover body.

Further, the magnet may be placed in a center of the support.

Further, the first surface of the cover body may be provided with a protector for protecting both the magnet and the support so as to prevent both the magnet and the support from being exposed to an outside.

Further, the pattern electrode unit may include a power electrode and a ground electrode.

Further, the pattern electrode unit may include at least one of a first data electrode, a second data electrode and an ID electrode.

Further, the pattern electrode unit may correspond to a pin terminal unit of the outside charger.

The back cover may further include subsidiary magnets placed in four sides of the cover body at locations spaced apart from the pattern electrode unit by the same distance.

As described above, the present invention is advantageous in that the back cover for mobile terminals can easily electrically charge a mobile terminal by connecting the mobile terminal to an outside charger using a magnet without using connectors.

Another advantage of the present invention resides in that the back cover does not use connectors when electrically charging the mobile terminal so that the back cover is completely free from damage of connectors which may be caused by a frequent connection of the connectors.

Further advantage of the present invention resides in that the back cover mounted to the mobile terminal includes the magnet so that the mobile terminal can be easily attached to a magnet-type handsfree holder or to a metal surface without using additional elements.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
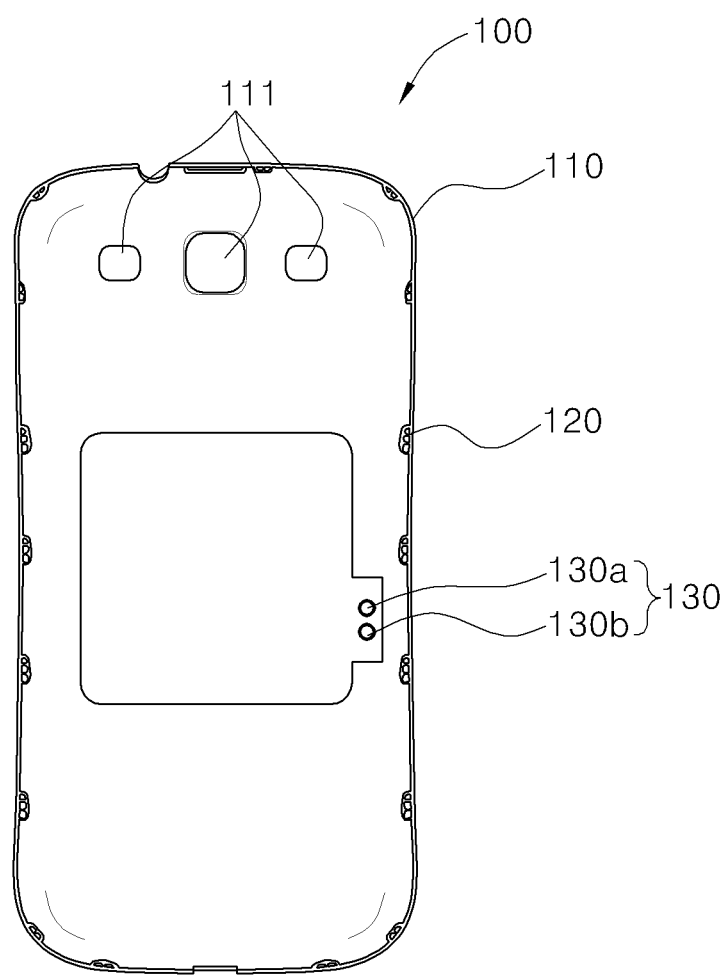
FIG. 1 is a view illustrating a front surface of a back cover for mobile terminals according to an embodiment of the present invention.

Hereinbelow, preferred embodiments of the present invention will be described in detail with reference to the accompanying drawings. Wherever possible, the same reference numerals will be used throughout the drawings and the description to refer to the same or like parts. In the following description, it is to be noted that, when the functions of conventional elements and the detailed description of elements related with the present invention may make the gist of the present invention unclear, a detailed description of those elements will be omitted.

Figure 2:
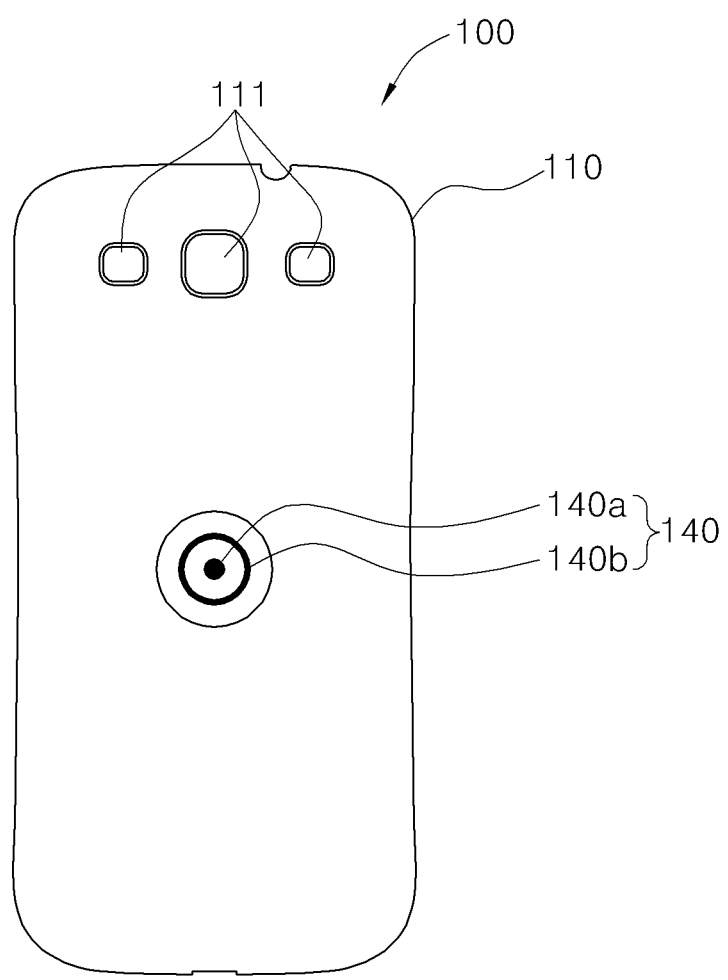
FIG. 2 is a view illustrating a rear surface of the back cover for mobile terminals according to the embodiment of the present invention.
Figure 3:
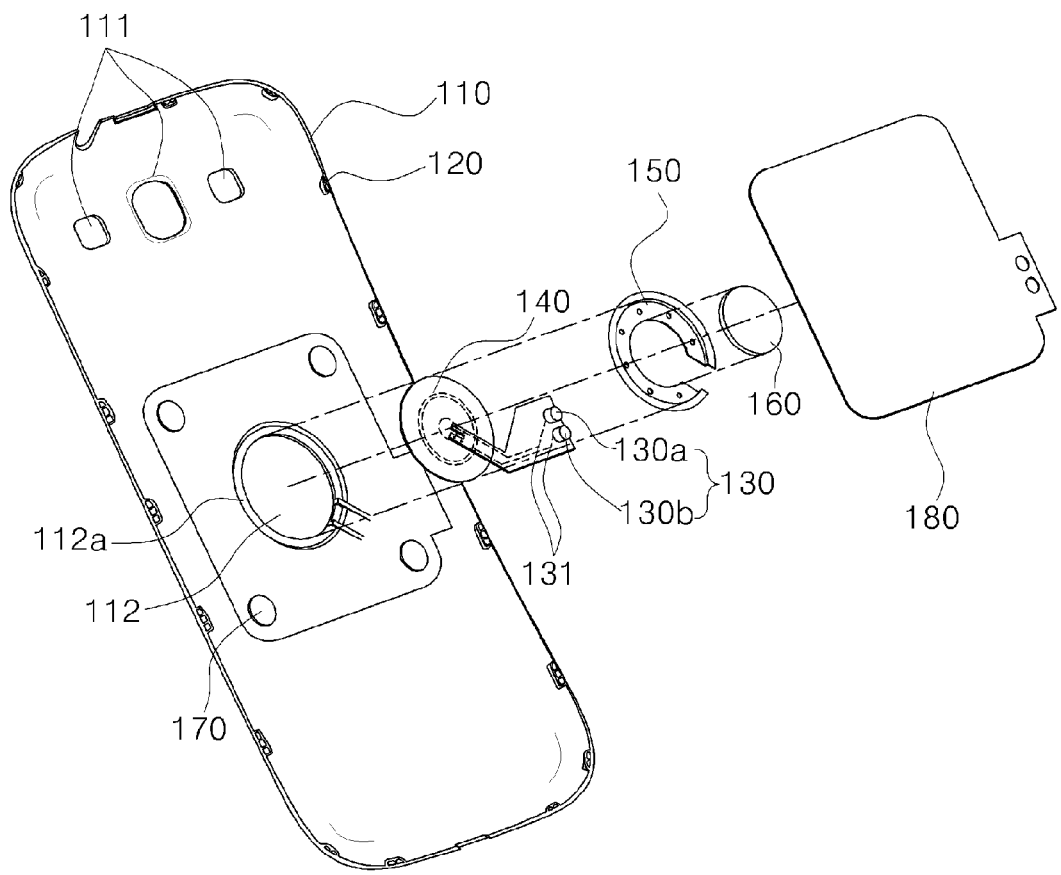
FIG. 3 is an exploded perspective view illustrating parts provided on the front surface of the back cover for mobile terminals according to the embodiment of the present invention.

FIG. 1 is a view illustrating a front surface of a back cover for mobile terminals according to an embodiment of the present invention. FIG. 2 is a view illustrating a rear surface of the back cover for mobile terminals according to the embodiment of the present invention. FIG. 3 is an exploded perspective view illustrating parts provided on the front surface of the back cover for mobile terminals according to the embodiment of the present invention. As shown in the drawings, the back cover 100 for mobile terminals according to the present invention includes a cover body 110, hooks 120, a terminal unit 130, a pattern electrode unit 140 and a magnet 160.

Figure 4:
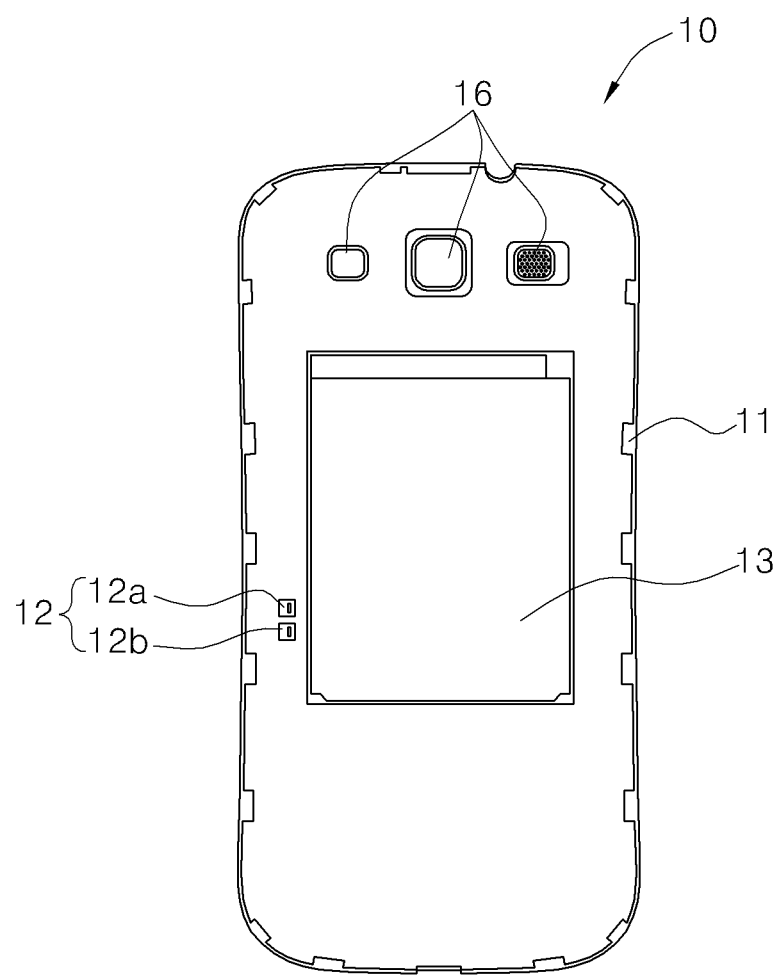
FIG. 4 is a view illustrating the appearance of the rear surface of a general mobile terminal.
Figure 5:
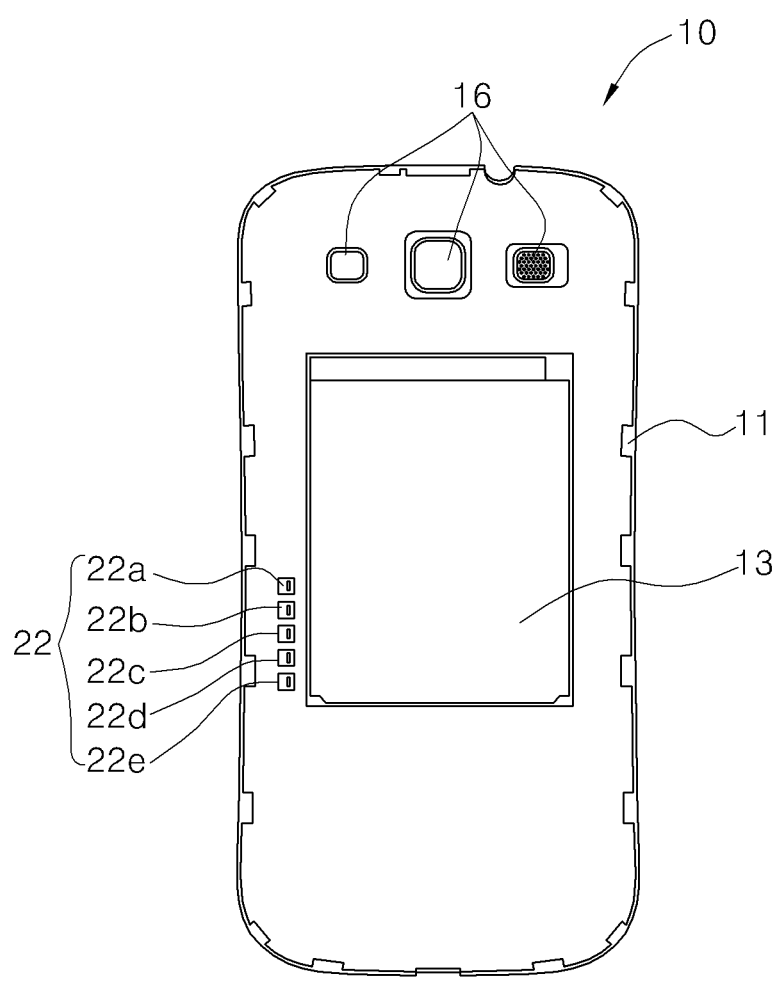
FIG. 5 is a view illustrating the appearance of the rear surface of an upgraded mobile terminal.

Here, the cover body 110 is configured to be mounted to the rear surface of a mobile terminal 10 so that the cover body 110 can cover and protect a battery 13 that is installed in the rear surface of the mobile terminal 10 as shown in FIGS. 4 and 5.

In the present invention, the cover body 110 may be provided with holes 111 that can allow additional function units 16 of the mobile terminal 10, such as a camera, a speaker and a flash, to be exposed to the outside.

Here, the hooks 120 are formed on the edge of the cover body 110 and are locked to locking slots 11 that are formed on the edge of the rear surface of the mobile terminal 10 shown in FIGS. 4 and 5. Therefore, the cover body 110 can be mounted to the mobile terminal 10 by the hooks 120 that are locked to the locking slots 11.

In other words, the back cover 100 can be mounted to the rear surface of the mobile terminal 10.

Here, the terminal unit 130 is formed using a conductive material on a first surface of the cover body 110 at a location corresponding to terminals 12, 22 of the mobile terminal 10 so that the terminal unit 130 can be electrically connected to the terminals 12, 22 of the mobile terminal 10.

The terminals 12, 22 of the mobile terminal 10 may be formed in manners shown in FIGS. 4 and 5.

The terminals 12 which are provided on the rear surface of a general mobile terminal as shown in FIG. 4 include a power terminal 12a and a ground terminal 12b. The terminals 22 which are provided on the rear surface of an upgraded mobile terminal that is shown in FIG. 5 and is upgraded in comparison with the general mobile terminal of FIG. 4 include a power terminal 22a, a ground terminal 22b, a first data terminal 22c, a second data terminal 22d and an ID terminal 22e.

Here, the order and locations of the terminals 22 of the upgraded mobile terminal may be easily changed and the first data terminal 22c, the second data terminal 22d and the ID terminal 22e may be preset so as to realize effective data transmission according to the model of the mobile terminal. At this time, the preset terminals 22 may be changed according to the model and the manufacturer of the mobile terminal and a detailed description of the functions of the respective terminals will be omitted.

Further, the terminal unit 130 may be formed as a protrusion type unit so that the terminal unit 130 can come into easy contact with the terminals 12, 22 of the mobile terminal.

The terminal unit 130 may include a power terminal 130a and a ground terminal 130b so as to correspond to the terminals 12 of the general mobile terminal or may include a power terminal 130a, a ground terminal 130b, a first data terminal (not shown), a second data terminal (not shown) and an ID terminal (not shown) so as to correspond to the terminals 22 of the upgraded mobile terminal. Here, the terminals of the terminal unit 130 correspond to the terminals 22 of the mobile terminal 10, respectively.

FIGS. 1 to 3 are shown based on the terminal unit 130 that has two terminals corresponding to the terminals 12 of the general mobile terminal.

Here, the pattern electrode unit 140 is provided on a second surface of the cover body 110 and is electrically connected to the terminal unit 130 that is provided on the first surface of the cover body 110 and electrically connects the terminals 12 of the mobile terminal to an outside charger 200.

In the present invention, the first surface and the second surface of the cover body 110 can be defined as follows.

The first surface of the cover body 110 may be an inside surface (the front surface of the back cover) that is mounted to the rear surface of the mobile terminal 10, and the second surface of the cover body 110 may be an outside surface (the rear surface of the back cover) that is connected to the outside charger 200.

Here, to protect the mobile terminal 10 from external electric shock of both the terminal unit 130 and the pattern electrode unit 140 when the terminal unit 130 and the pattern electrode unit 140 are electrically connected to each other, a protective circuit (not shown) may be provided in the back cover or the mobile terminal 10 may be provided with a protective circuit.

Figure 6:
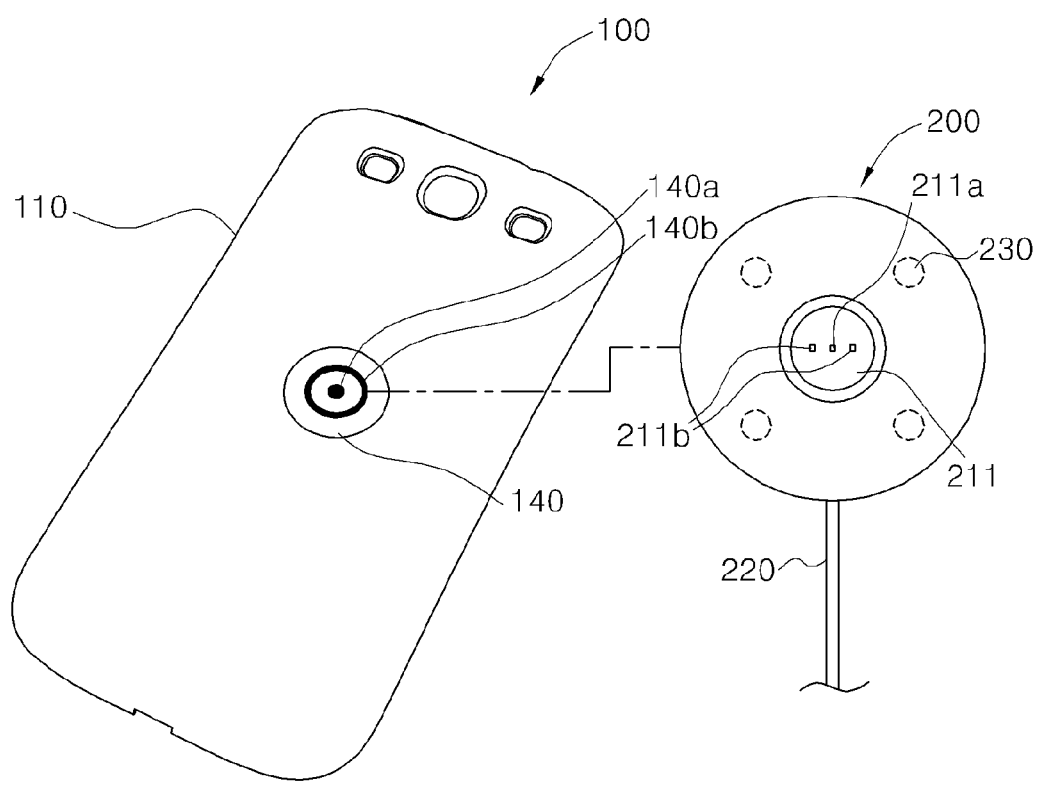
FIG. 6 is a view illustrating a connection of a back cover for general mobile terminals according to a first embodiment of the present invention to a pin terminal unit of an outside charger.
Figure 7:
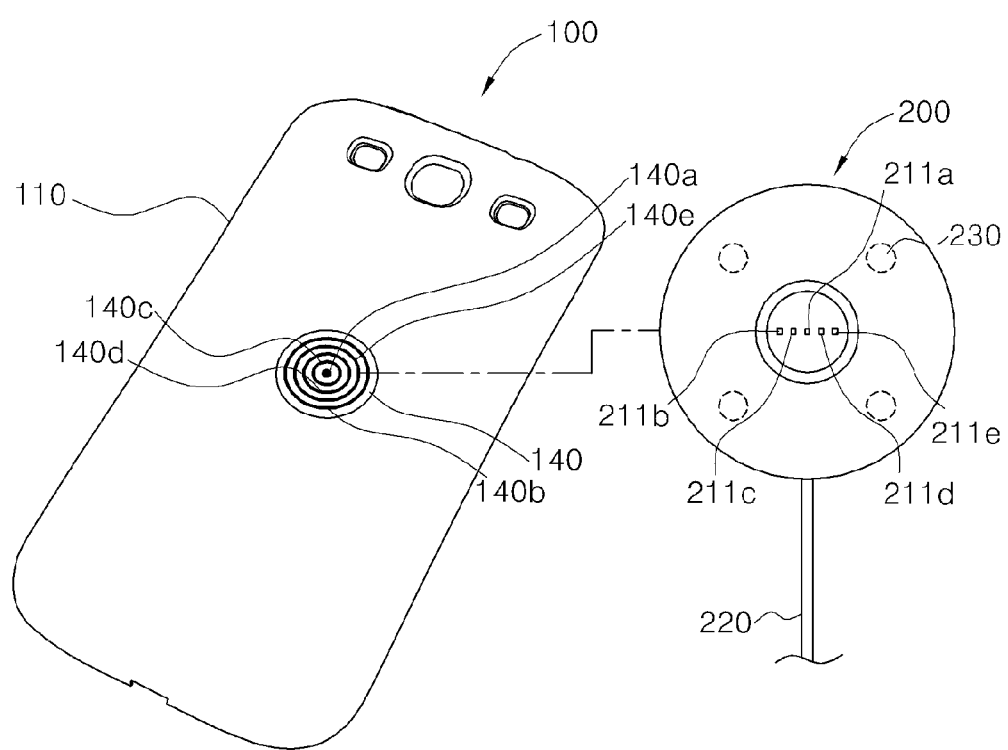
FIG. 7 is a view illustrating a connection of a back cover for upgraded mobile terminals according to a second embodiment of the present invention to a pin terminal unit of an outside charger.

Further, in the same manner as that of the terminal unit 130, the pattern electrode unit 140 may include a power electrode (V+) 140a and a ground electrode (GND) 140b as shown in FIG. 6 or may include a power electrode 140a, a ground electrode 140b, a first data electrode 140c, a second data electrode 140d and an ID electrode 140e as shown in FIG. 7.

Here, the pattern electrode unit 140 may be designed to have a concentric circular arrangement.

In a pattern electrode unit 140 in which the two electrodes 140a and 140b are designed to form concentric circles, the two electrodes 140a and 140b may be designed in such a way that the inner circle is used as the power electrode 140a and the outer circle is used as the ground electrode 140b in the same manner as that of the embodiment of the present invention.

Further, it is preferred that the pattern electrode unit 130 be differently designed according to the shape of the outside charger 200.

Here, when the pattern electrode unit 140 is designed to have the concentric circular arrangement, the pattern electrode unit 140 can easily come into contact with a pin terminal unit 211 of the outside charger 200 regardless of the contact direction if the pattern electrode unit 140 comes into contact with the pin terminal unit 211 of the outside charger 200 by the magnet 160.

Here, the magnet 160 is placed on the cover body 110 so as to be magnetically connected to the outside charger 200 as will be described hereinbelow.

The construction which is provided on the first surface of the cover body 110 so as to connect the pattern electrode unit 140 to the outside charger 200 will be described.

The pattern electrode unit 140 of the back cover 100 is arranged in a through hole 112 that is formed in a predetermined portion of the cover body 110 adjacent to the terminal unit 130. Here, the pattern electrode unit 140 is placed in such a way that the concentric circular electrode pattern of the pattern electrode unit 140 can be exposed to the second surface of the cover body 110.

Here, to hold the pattern electrode unit 140 in such a way that the pattern electrode unit 140 can be exposed to the second surface of the cover body 110 without being undesirably separated from the cover body 110, it is preferred that a step 112a be formed in the first surface of the cover body 110 at a location around the through hole 112.

Here, it is preferred that the pattern electrode unit 140 have a diameter larger than that of the through hole 112 so that the pattern electrode unit 140 can be prevented from the second surface of the cover body 110.

To hold the pattern electrode unit 140 in the through hole 112 of the cover body 110, the pattern electrode unit 140 is placed in the through hole 112 in such a way that a surface of the pattern electrode unit 140 on which the concentric circular electrode pattern is formed is directed to the second surface of the cover body 110. Thereafter, a support 150 that can support the pattern electrode unit 140 and can prevent the pattern electrode unit 140 from being removed is placed on a top surface of the pattern electrode unit 140 at a position on the first surface of the cover body 110. Here, the top surface of the pattern electrode unit 140 means a second surface on which no electrode pattern is formed.

The support 150 may be designed to have a circular horseshoe shape. The magnet 160 is placed in the center of the circular horseshoe-shaped support 150. In other words, the center of the support 150 is empty so that the support 150 can be placed so as to surround the magnet 160.

Here, the back cover can be designed in such a way that electric lines 131 for electrically connecting the power electrode 140a and the ground electrode 140b of the pattern electrode unit 140 to the power terminal 130a and the ground terminal 130b of the terminal unit 130 can pass through the mouth of the circular horseshoe-shaped support 150.

When the support 150 is designed in the form of the circular horseshoe, the thickness of the back cover 100 can be reduced.

Here, the magnet 160 is placed in the center of the support 150 and may be an S pole or N pole magnet. The polarity of the magnet 160 may be determined so as to be opposite to the polarity of a magnet (not shown) that is embedded in the outside charger 200.

At this time, the magnetic force of the magnet 160 is determined so that it can be easily changed and, accordingly, the magnetic force is not limited in the present invention.

Due to the magnet 160 that can magnetically connect the back cover 100 to the outside charger 200, the mobile terminal 10 can be easily attached to a magnet-type handsfree holder or to a metal surface without using additional elements.

Further, a protector 180 is provided in the back cover 100 so that the protector 180 can cover and protect the elements, such as the support 150 and the magnet 160, provided on the first surface while exposing only the terminal unit 130 to the outside. Here, because the protector 180 exposes the terminal unit 130 to the outside, the terminal unit 130 can be electrically connected to the terminals 12, 22 of the mobile terminal 10.

At this time, the protector 180 may be made of a thin flexible material, such as an insulating film or an insulating tape.

Further, subsidiary magnets 170 may be placed in four sides of the cover body 110 at locations spaced apart from the pattern electrode unit 140 by the same distance. Here, because the subsidiary magnets 170 are placed at locations spaced apart from the pattern electrode unit 140 by the same distance, the pattern electrode unit 140 can be efficiently connected to the pin terminal unit 211 of the outside charger 200 regardless of a manner in which the pattern electrode unit 140 is connected to the outside charger 200.

The above-mentioned back cover 100 for mobile terminals can realize an electric charging of a mobile terminal in a state in which the back cover 100 is connected to the outside charger 200 as shown in FIGS. 6 and 7.

The outside charger 200 includes the pin terminal unit 211 in a housing 210 so that the pin terminal unit 211 can come into contact with the power electrode (V+) 140a and the ground electrode (GND) 140b of the pattern electrode unit 140. Further, a magnet (not shown) is embedded in the outside charger 200 at a location inside the pin terminal unit 211. Here, the pin terminal unit 211 may include a power terminal 211a and a ground terminal 211b as shown in FIG. 6 so that the terminals 211a and 211b can correspond to the power electrode 140a and the ground electrode 140b of the pattern electrode unit 140, respectively. Further, the pin terminal unit 211 may include a power terminal 211a, a ground terminal 211b, a first data terminal 211c, a second data terminal 211d and an ID terminal 211e as shown in FIG. 7 so that the terminals 211a, 211b, 211c, 211d and 211e can correspond to the power electrode 140a, the ground electrode 140b, the first data electrode 140c, the second data electrode 140d and the ID electrode 140e of the pattern electrode unit 140, respectively.

Further, subsidiary magnets 230 may be placed in four sides of the outside charger 200 at locations spaced apart from the pin terminal unit 211 by the same distance so that subsidiary magnets 230 of the outside charger 200 can be connected to the respective subsidiary magnets 170 that are placed in four sides of the cover body 110 at locations spaced apart from the pattern electrode unit 140 by the same distance. Here, it is preferred that the subsidiary magnets 170 and 230 have opposite polarities.

Due to the subsidiary magnets 170 and 230, the connection force of the back cover 100 to the outside charger 200 can be increased.

Further, the subsidiary magnets 170 and 230 can allow the back cover 100 to be efficiently connected to the outside charger 200 by rotating at any angle relative to the outside charger 200.

A cable 220 is connected to a side of the outside charger 200 so as to supply DV power to the outside charger 200 using a USB connector (not shown).

Further, the pin terminal unit 211 of the outside charger 200 may be arranged in a straight line so as to correspond 1:1 to the concentric circular pattern electrode unit 140.

Described in brief, the pin terminal unit 211 is arranged so as to correspond 1:1 to the pattern electrode unit 140.

To electrically charge the mobile terminal 10 using the outside charger 200, the USB connector (not shown) that is connected to an end of the cable 220 of the outside charger 200 may be connected to a USB terminal of a computer, thereby charging the mobile terminal 10 using DC power output from the computer. Alternatively, an adapter (not shown) may be used to charge the mobile terminal 10.

Here, the shape of the outside charger 200 may be changed from the shapes shown in FIGS. 6 and 7. In other words, the shape of the housing 210 can be freely changed if the shape of the pin terminal unit 211 that is connected to the pattern electrode unit 140 of the back cover 100 is retained.

Here, the outside charger 200 is not included in the gist of the present invention so that a further description of the outside charger 200 will be omitted.

In FIGS. 6 and 7, the pin terminal unit 211 of the outside charger 200 is shown in an effort to illustrate the pin terminal unit 211. However, to electrically charge the mobile terminal 10, it is preferred that the surface of the outside charger 200 on which the pin terminal unit 211 is formed be attached to the surface of the pattern electrode unit 140 of the back cover 100.

Accordingly, the back cover for mobile terminals according to the present invention is advantageous in that the back cover can realize an electric charging of a mobile terminal by connecting the mobile terminal to an outside charger using a magnet without connecting the mobile terminal to the outside charger using connectors and, accordingly, the present invention can improve the work efficiency when charging the mobile terminal.

Further, another advantage of the present invention resides in that the back cover is completely free from damage of connectors which may be caused by a frequent connection of the connectors for charging.

The construction and operational function of the back cover for mobile terminals according to the present invention is not limited to those of the above-mentioned embodiments. The embodiments of the present invention may be freely modified by combining the elements of the embodiments totally or selectively.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A back cover for mobile terminals, which is mounted to a rear surface of a mobile terminal so as to electrically charge the mobile terminal using terminals provided by the mobile terminal, the back cover comprising:
   a cover body mounted to a rear surface of the mobile terminal;
   a plurality of hooks formed on an edge of the cover body and locked to the rear surface of the mobile terminal;
   a terminal unit provided on a first surface of the cover body at a location corresponding to the terminals of the mobile terminal;
   a pattern electrode unit provided on a second surface of the cover body and electrically connected to the terminal unit, the pattern electrode unit having an electrode that electrically connects the terminals of the mobile terminal to an outside charger and comprising concentric circular electrodes; and
   a magnet installed in the cover body and magnetically connected to the outside charger.

2. The back cover for mobile terminals as set forth in claim 1, wherein the pattern electrode unit is arranged in a through hole formed in a predetermined portion of the cover body adjacent to the terminal unit and is exposed to the second surface of the cover body.

3. The back cover for mobile terminals as set forth in claim 2, further comprising: a step formed around the through hole; and a support held by the step and supporting the pattern electrode unit in such a way that the support prevents the pattern electrode unit from protruding outside the second surface of the cover body.

4. The back cover for mobile terminals as set forth in claim 3, wherein the magnet is placed in a center of the support.

5. The back cover for mobile terminals as set forth in claim 3, wherein the first surface of the cover body is provided with a protector for protecting both the magnet and the support so as to prevent both the magnet and the support from being exposed to an outside.

6. The back cover for mobile terminals as set forth in claim 1, wherein the pattern electrode unit includes a power electrode and a ground electrode.

7. The back cover for mobile terminals as set forth in claim 6, wherein the pattern electrode unit includes at least one of a first data electrode, a second data electrode and an ID electrode.

8. The back cover for mobile terminals as set forth in claim 1, wherein the pattern electrode unit corresponds to a pin terminal unit of the outside charger.

9. The back cover for mobile terminals as set forth in claim 1, further comprising: subsidiary magnets placed in four sides of the cover body at locations spaced apart from the pattern electrode unit by the same distance.

* * * * *